United States Patent [19]
Yaguchi

[11] Patent Number: 5,537,012
[45] Date of Patent: Jul. 16, 1996

[54] DC MOTOR CONTROL CIRCUIT AND DC MOTOR

[75] Inventor: Osamu Yaguchi, Kashiwazaki, Japan

[73] Assignee: Kabushiki Kaisha Riken, Tokyo, Japan

[21] Appl. No.: 280,603

[22] Filed: Jul. 26, 1994

[30]     Foreign Application Priority Data

Aug. 3, 1993  [JP]  Japan .................................. 5-210911

[51] Int. Cl.⁶ ...................................................... H02P 7/24
[52] U.S. Cl. ........................... 318/254; 318/138; 388/840; 388/919
[58] Field of Search ..................................... 318/254, 138, 318/439; 388/839, 840, 919

[56]              References Cited

U.S. PATENT DOCUMENTS

| | | | |
|---|---|---|---|
| 4,066,895 | 1/1978 | Kishi | 455/212 |
| 4,232,258 | 11/1980 | Matsumura | 388/839 |
| 4,262,260 | 4/1981 | Tamura | 330/109 |
| 4,636,702 | 1/1987 | Hedges | 318/812 |
| 4,968,921 | 11/1990 | Giardini | 318/138 |
| 4,987,352 | 1/1991 | Ishii | 318/254 |
| 5,005,081 | 4/1991 | Asano | 358/167 |
| 5,159,284 | 10/1992 | Jung et al. | 330/144 |
| 5,262,703 | 11/1993 | Schmider et al. | 318/254 |
| 5,376,866 | 12/1994 | Erdman | 318/254 |

Primary Examiner—John W. Cabeca
Attorney, Agent, or Firm—Parmelee, Bollinger & Bramblett

[57]                ABSTRACT

A DC motor control circuit for controlling a restraint torque of a DC motor which continues the rotation by triggering an external force. This control circuit is installed in a DC motor. In a DC motor control circuit comprising a drive transistor collector connected to a first brush of a DC motor, and a detection transistor collector connected to the base of said drive transistor and base connected to said first brush, a variable resistor is connected between the emitter of said detection transistor and a second brush of said DC motor and a capacitor connected between their one end and movable terminal of said variable resistor. The control circuit further comprises a drive current limiter for the drive transistor.

6 Claims, 4 Drawing Sheets

DC MOTOR CONTROL CIRCUIT AND DC MOTOR

BACKGROUND OF THE INVENTION

1. Field of the Invention

This invention relates to a DC motor control circuit and a DC motor with the control circuit installed therein. More particularly, this invention relates to such motors suitable for use in toys of a vehicle.

2. Description of the Prior Art

Control circuits for unidirectionally driving DC motors according to JP-A-63-302780 and 4-109846 are applied by the present inventor. Other control circuits for bidirectionally driving DC motors according to JP-A-63-302779, 4-109846 and 4-112695 as well as EP-A-0 345 914 are also proposed by same inventor. Taiwan patent 179772 issued on Mar. 1, 1992 is equivalent to the combination of JP-A-4-109846 and 4-112695.

Referring now to FIG. 1, a control circuit for unidirectionally driving DC motor is shown. It comprises a drive transistor 11 capable of driving a DC motor 10. The drive transistor 11 is emitter coupled to a positive power supply line 13 connected to a positive electrode of a DC power supply 12. Its collector is connected to a brush 14 of the DC motor 10, and its base is connected to the collector of a detection transistor 15 to detect the rotation of the DC motor 10. The detection transistor 15 is emitter coupled through a resistor 16 to a ground line 17 connected to a negative electrode of the power supply 12. Also, another brush 18 of the DC motor 10 is connected to the ground line 17.

In the control circuit, transistors 11 and 15 are in OFF state under a static or rest condition where the DC motor 10 is not rotating. When the external force causes the rotation of a rotor of the DC motor 10, the DC motor 10 generates induced voltage pulses Vn each proportional to its rotation number N of the rotor and certain DC components between the brushes 14 and 18.

$$Vn = A \times N$$

where, A is a constant. Each pulse has a pair of negative and positive pulse components when the rotating rotor of the motor 10 comes to a predetermined angular position relative to a stator thereof.

When the induced voltage Vn exceeds a certain threshold value, for example, 0.65 volt, the emitter current of the detection transistor 15 increases through the resistor 16, and then its collector current increases. Therefore, the drive transistor 11 whose base receives the collector current of the detection transistor 15 is turned on with its collector current being supplied to the DC motor 10 and the base of the transistor 15 to maintain the rotation of the DC motor 10. Also, the detection transistor 15 maintains its ON state.

In the rotating DC motor 10, impedance of the rotor coils is abruptly changed at angular positions between brushes 14 and 18. Succeeding narrow positive and negative pulse voltages called reactance voltages are periodically generated by an electromagnetic induction between brushes 14 and 18. With the negative pulses among them, the base-emitter voltage of the transistor 15 is reverse biased to cause the transistors 11 and 15 to instantly turn off. However, where the DC motor is rotating by an inertia, the drive transistor 11 will substantially maintain an ON state by the induced voltage of the positive DC component.

When the external force causes the rotating DC motor 10 to stop, the transistor 15 is turned off by the negative pulse irrespective that the constraint current generally continues to passing through the rotor coils. When the rotation number of the DC motor 10 is reduced to near the stop condition, the DC component of the induced voltage Vn between the brushes 14 and 18 is reduced under the threshold value, and then the detection transistor 15 is turned off after applying the negative pulse. Accordingly, the control circuit returns to the rest condition. The resistor 16 connected to the emitter of the detection transistor 15 acts as a negative feedback element to its collector current.

FIG. 2 shows another control circuit for bidirectional driving a DC motor. The control circuit comprises four drive transistors 21 to 24 bridge-connected between power supply terminals (circled 1 and 2), and a DC motor 10 connected between bridge points, i.e., output terminals (circled 3 and 4). The drive transistors 21 and 23 are emitter coupled to the positive power supply terminal (circled 1) or line 13 while the drive transistors 22 and 24 are emitter coupled to the negative power supply terminal (circled 2) or line 17.

The base of a normal detection transistor 25 for detecting an induced voltage upon the normal rotation is connected to a brush 14 of the DC motor 10 through a resistor 27. The emitter of a reverse detection transistor 26 for detecting an induced voltage upon the reverse rotation is connected to the brush 14 through the resistor 27. The emitter of the transistor 25 is connected to a brush 18 of the DC motor 10 through a resistor 28. The base of the transistor 26 is connected to the brush 18 through the resistor 28. The collectors of the detection transistors 25 and 26 are connected to the bases of the master drive transistors 21 and 23, respectively. Slave transistors 22 and 24 slave connected to the master drive transistor 21 and 23, respectively, have bases connected to output terminals (circled 3 and 4) through resistors 29 and 30, respectively.

When the normal detection transistor 25 is turned on by the external force applied to the DC motor 10, the drive transistors 21 and 22 are turned on to provide a current to the DC motor 10 from the terminals (circled 3 to 4), and then normal rotate the DC motor 10. Therefore, the transistors 25, 21 and 22 constitute a normal rotation driving circuit. Contrarily, when the reverse detection transistor 26 is turned on by the external force applied to the DC motor 10, the drive transistors 23 and 24 are turned on to provide another current to the DC motor 10 from the terminals (circled 4 to 3), and then reverse rotate the DC motor 10. Therefore, the transistors 26, 23 and 24 constitute a reverse rotation driving circuit.

Since the normal and reverse rotation circuits in FIG. 2 are symmetrical, the operation of the normal rotation driving circuit is discussed as follows. When the transistor 25 is turned on, its collector current is amplified by the master drive transistor 21. The current-amplified collector current of the drive transistor 21 is supplied to the brush 14 and the base of slave drive transistor 22 through the resistor 29. The collector of the slave transistor 22 sinks the current from the brush 18. A portion of the current supplied between brushes 14 and 18 of the DC motor 10 is supplied to the base-emitter of the detection transistor 25 through resistors 27 and 28 to maintain an ON state of the detection transistor 25.

The control circuit as shown in FIG. 2 kept the rest condition in a static condition of the DC motor 10. When the external force causes a rotor of the DC motor 10 to normal rotate, an induced voltage proportional to its rotation rate of the rotor is generated between the brushes 14 and 18. When this induced voltage exceeds a certain threshold value of the base-emitter voltage of the transistor 25, for example, 0.65 volt, the transistor 25 is turned on with increased base, emitter and collector currents through resistors 27 and 28. The collector current of the drive transistor 21 to which the collector current of the transistor 25 is provided as the base current increases and its collector current is partially supplied to the base of the slave drive transistor 22 through the resistor 29 to turn on the transistor 22.

While, the emitter current of the detection transistor 25 through the resistor 28 may be supplied to the base of the reverse drive transistor 24 to turn on it. However, since an ON resistance of the normal drive transistor 22 is lower than that of the reverse drive transistor 24, the transistor 24 transfers to OFF state. Therefore, the potential of the brush 14 of the DC motor 10 equals to the power supply voltage and the potential of the brush 18 equals to ground potential.

Reversely, when the external force causes the DC motor 10 to reverse rotate, transistor 26, 23 and 24 are sequentially turned on to maintain a reverse rotation condition after releasing the external force. The reverse rotating DC motor 10 also abruptly changed impedance of the rotor coils at angular positions between the brushes and generates successive narrow positive and negative pulses by the electromagnetic induction.between brushes 14 and 18.

When, for example, transistors 25, 21 and 22 are in an ON state and the DC motor 10 is rotating, the negative pulses generated between brushes 14 and 18 causes the base-emitter voltage of the transistor 15 to reverse bias and then these transistors to instantly turn off. However, where the DC motor is rotating, the control circuit maintains an active condition by the positive induced voltage.

When the external force restraints the rotating DC motor 10 to stop, the detection transistor 25 is turned off by the negative pulse irrespective that the constraint current generally continues to passing therethrough. When the rotation number of the DC motor 10 is reduced to near the stop condition, the DC component of the induced voltage between the brushes 14 and 18 is reduced under the threshold value, and then the detection transistor 25 is turned off. Accordingly, the control circuit returns to the rest condition.

The negative pulses generated between the brushes 14 and 18 of the DC motor 10 are applied between the base and emitter of the transistor 26. These pulses are absorbed by a capacitor 31 connected between the bases of the transistors 25 and 26. Accordingly, the transistors 26, 23 and 24 are not turned on.

As described the above, the control circuit shown in FIG. 2 can become two states, the active and rest states by the external forced rotation and stop of the DC motor as well as those of FIG. 1.

In such a DC motor control circuit, the restraint torque of the DC motor is changed depending upon the voltage change of the DC power supply which is generally a battery or dry cells. That is, higher power supply voltage causes an increasing restraint torque, while lower power supply voltage causes a decreasing restraint torque of the motor.

The conventional DC motor control circuit does not have a function for adjusting the constraint torque. In particular, when these control circuits are installed in electric toys and new dry cells are used as the DC power supply, it have a problem that the rotation of the DC motor would not stopped even if a predetermined load is applied to the DC motor because its power supply voltage is higher than that of the mean operation condition. Also, it is difficult to adjust a desired constraint torque.

SUMMARY OF THE INVENTION

Accordingly, it is an object of the present invention to provide a control circuit for a DC motor in which its restraint torque is adjustable even if the voltage of a power supply is changed.

It is another object to provide a compact DC motor control circuit installed in a DC motor case or housing in which its restraint torque is adjustable according to ratings of the DC motor.

It is an additional object to provide a compact DC motor in housing of which a control circuit having constants according to capacity of the DC motor is mounted.

According to an aspect of the present invention, a control circuit for a DC motor comprises:

a detection transistor being turned on when a DC component of a induced voltage generated during the rotation of the DC motor and instantly turned off by pulse components of the induced voltage;

a drive transistor receiving an output current of said detection transistor as a control current to supply a drive current to said DC motor when said detection transistor is turned on;

a variable resistor being a load resistor of said detection transistor and acted as negative feedback to its control input; and a capacitor connected between their one end and a movable terminal.

According to a first embodiment of the present invention, there is provided a DC motor control circuit comprising:

a drive transistor having its collector connected to a first brush of a DC motor;

a detection transistor having its collector connected to the base of said drive transistor and its base connected to said first brush;

a variable resistor connected between the emitter of said detection transistor and a second brush of said DC motor; and a capacitor connected between their one end and movable terminal of said variable resistor.

A DC motor according to the present invention includes the control circuit described the above and installed therein, and comprises a housing having two power supply terminals for feeding the power energy thereto, and an output terminal directly connected to the first brush.

According to a second embodiment of the present invention, the control circuit further comprises:

a second variable resistor connected between said detection transistor and said first brush, and a second slave drive transistor having its collector connected to said second brush and its base connected to said first brush through a third resistor to provide a normal rotation drive circuit;

a third drive transistor having its collector connected to said second brush;

a second detection transistor having its collector connected to the base of said second slave drive transistor, its base connected to said first variable resistor and its emitter connected to said second variable resistor;

a second capacitor connected between one end and movable terminal of said second variable resistor; and a fourth slave drive transistor having its collector connected to said first brush and its base connected to said second brush through a fourth resistor to provide a reverse rotation drive circuit.

Further, a DC motor control circuit according to another embodiment of the present invention, said first and third drive transistors are emitter coupled to a first power supply line and said second and fourth drive transistors are emitter coupled to a second power supply line. Another DC motor according to another embodiment of the present invention includes the control circuit installed therein in which four drive transistors are bridge connected each other, and comprises a housing having two power supply terminals for feeding the power energy thereto, and two output terminals directly connected to the first and second brushes, respectively.

During rotating DC motor, levels of positive and negative pulses within an induced voltage are changed proportional to its torque. These pulses are passing through the capacitors connected to the movable terminals or taps to reduce nominal resistance of the variable resistor. Also, the DC motor can install the control circuit having circuit constants matched with the characteristics of the DC motor. Then, in the housing of the DC motor, most significant terminals, there is provided two power supply terminals with which power is supplied to the DC motor and its control circuit and at least one output terminal directly connected to a brush of the DC motor.

A better understanding of the present invention can be obtained when the following detailed description of the preferred embodiments are considered in conjunction with following drawings, in which.

Figure 2:
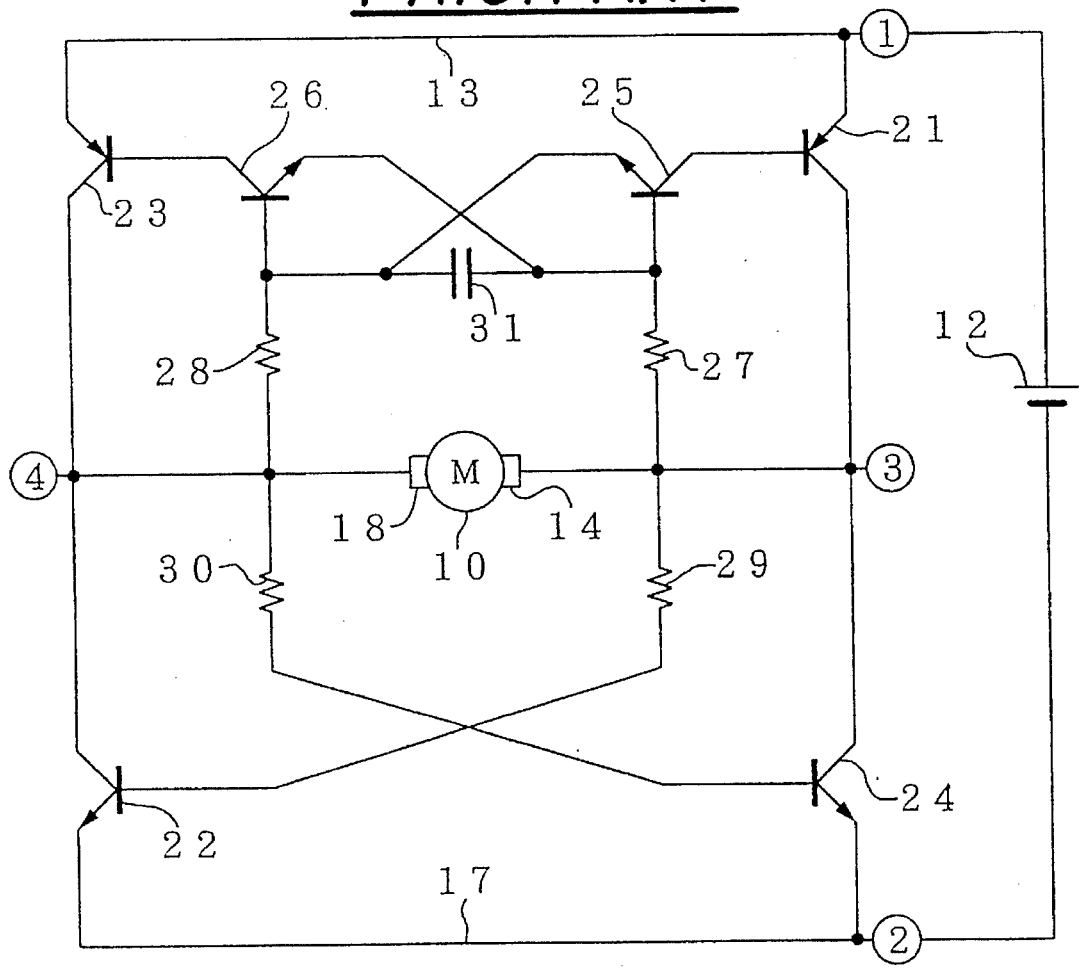
Figure 3:
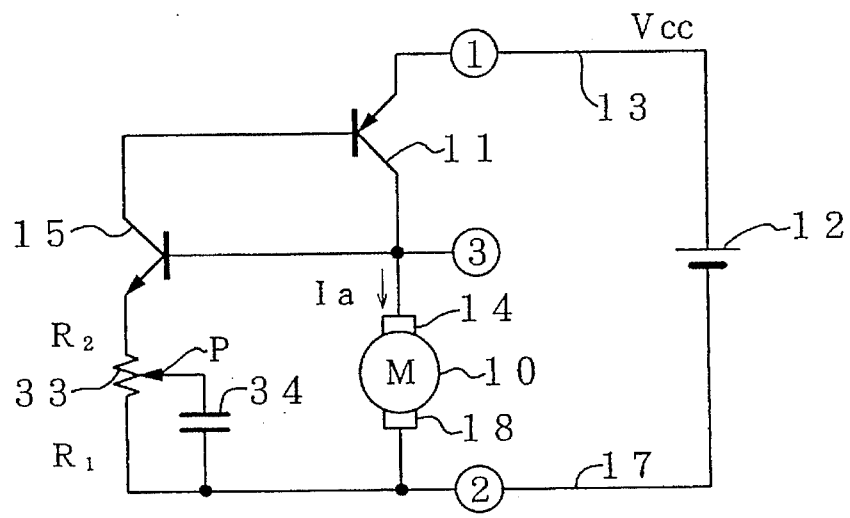
FIG. 3 is a schematic diagram of a control circuit of a DC motor showing a first embodiment of the invention.

Referring now to FIG. 3, a first embodiment of the invention, that is, a control circuit of a DC motor is generally shown. In FIGS. 3 to 8, the same reference numerals are used to denote the same components or parts as those in the prior art as shown in FIGS. 1 and 2.

Figure 1:
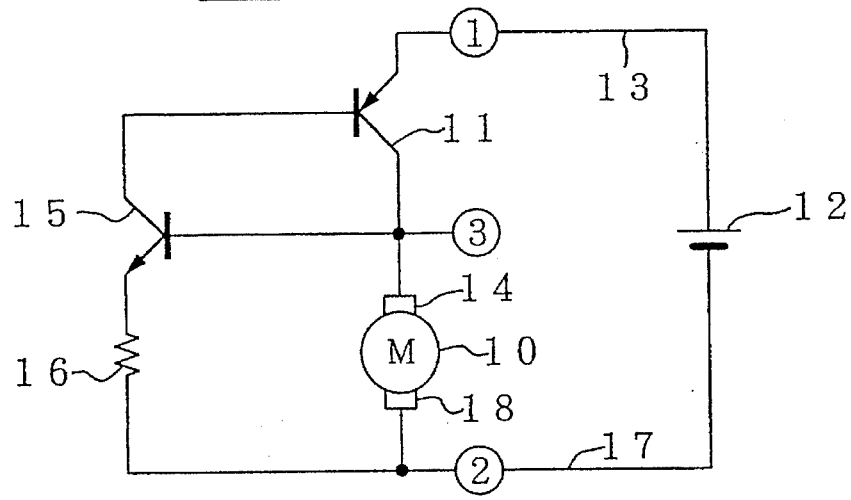
FIGS. 1 and 2 are schematic diagrams showing conventional control circuits of DC motors.

This control circuit is identical to that of FIG. 1 except that the resistor 16 is substituted with a same resistance variable resistor 33 having one end or negative power supply end and a movable terminal or tap P between which a capacitor 34 is connected to provide a high-pass filter with a variable cutoff frequency. The value of the capacitor 34 is predetermined so that the torque of the DC motor upon triggering is decreased when the movable terminal P is moved to the emitter side of the detection transistor 15, and increased when the movable terminal P is moved to the negative power supply terminal side. That is, the DC motor 10 has a phenomena that the torque is increased when the levels or amplitudes of positive and negative pulses generated during the rotation are increased, and the torque is decreased when the amplitudes of positive and negative pulses are decreased. By using this phenomena, its torque is controlled. Therefore, the variable resistor 33 and capacitor 34 constitute a high-pass filter with an adjustable cutoff frequency for high order harmonic components of the pulses.

Figure 5A:
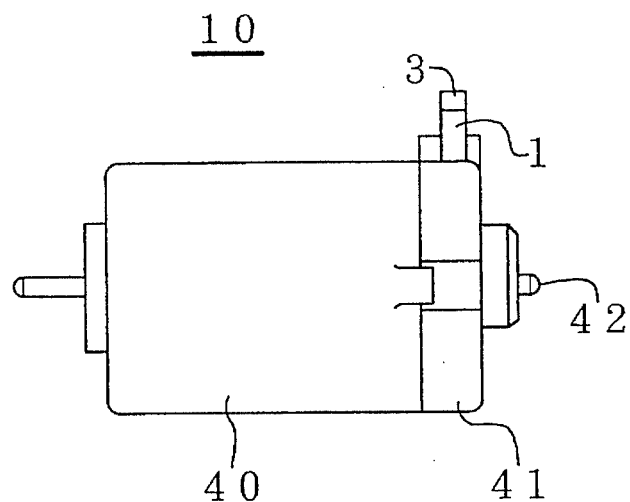
FIGS. 5a and 5b are a schematic diagram of a DC motor according to the invention in which the control circuit of FIG. 3 is installed.
Figure 5B:
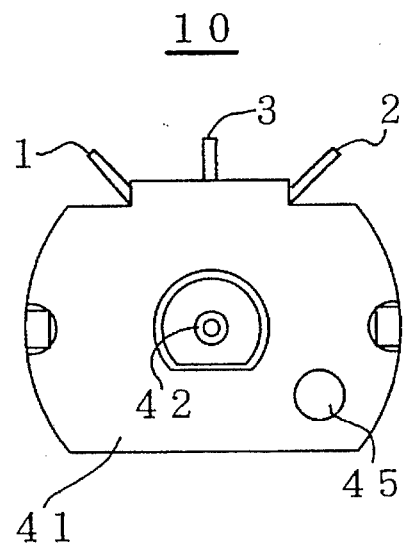
Figure 7:
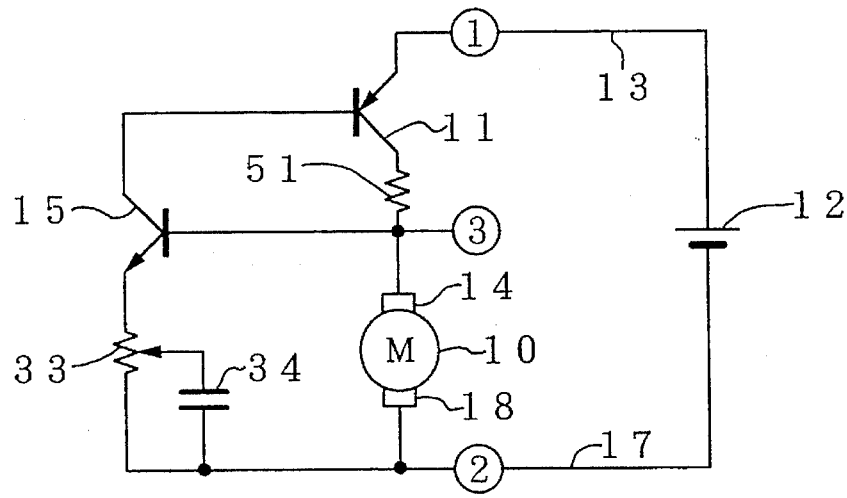
FIG. 7 is a schematic diagram of a control circuit of a DC motor showing a third embodiment of the invention similar to that of FIG. 3.

This DC motor control circuit is a monolithic or hybrid integrated circuit provided or integrated on silicon substrate or alumina ceramics, and installed or mounted on inner side or bracket 41 of a micro-motor or three-phase brush DC motor 10 as shown in FIGS. 5a and 5b. The power supply terminals and output terminal (circled 1, 2 and 3, respectively) as shown in FIGS. 3 and 7 are identical to the power supply terminals 1 and 2 and output terminal 3 each provided on the insulated bracket 41 of the DC motor 10 as shown in FIGS. 5a and 5b. A battery or DC power supply 12 is connected between the power supply terminals 1 and 2.

The control circuit is active when the external force causes an output axis 42 of the DC motor 10 to normal or unidirectional rotate, and becomes the rest condition upon restraining the rotating output axis 42. Therefore, when another load is connected between the output terminal 3 and negative power supply terminal 2, this load is also driven as well as turning on the DC motor 10. When an external switch (not shown) connected between the positive power supply terminal 1 and the output terminal 3 is turned on, collector current of the detection transistor 15 in an ON state is supplied to the base of the drive transistor 11, then the drive transistor is turned on to rotate the DC motor 10. The DC motor continues the rotation even if the external switch is turned off.

The value of the variable resistor is predetermined so that the drive transistor has a predetermined ON resistance when the output axis 42 of the DC motor 10 is constrained. That is, the value of the variable resistor 33 is preset so that the collector current of the drive transistor 11 is below the maximum rating current of the DC motor 10.

Basic operation of the DC motor control circuit as shown in FIG. 3 is substantially identical to those of FIG. 1, and the operation of its improvement portion is described. In FIG. 3, define that the voltage of the DC power supply is Vcc, the base-emitter voltage of the detection transistor 15 is $V_{BE1}$, and the saturated collector-emitter voltage of the drive transistor 11 is $V_{CE2sat}$. Further, the resistance between one end and the movable terminal P of the variable resistor 33 is assumed to be $R_1$, and the resistance between another end and the movable terminal P of the variable resistor 33 is assumed to be $R_2$. The voltage $V_p$ of the movable terminal P during the rotation of the DC motor 10 is as follows:

$$V_p = (Vcc - V_{BE1} - V_{CE2sat})R_1/(R_1 + R_2) \qquad (1)$$

The voltage of the movable terminal P may be varied by induced positive and negative pulses during the rotation without the capacitor 34, but smoothed to the stable DC component with the capacitor 34. The DC motor 10 is shut off when the induced voltage Va fulfils the following equation after periodical repeating instant or narrow cutoff by positive and negative pulse voltages or reactance voltage generated during the rotation.

$$Va \leq V_{BE1} - V_p \qquad (2)$$

In the control circuit of FIG. 13, the current Ia passing through the DC motor 10 is as follows:

$$Ia = (Vcc - Va)/R_M \qquad (3)$$

where $R_M$ is the resistance of rotor coils of the DC motor 10.

Further, the induced voltage Va at the time the DC motor is stopped by force is as follows:

$$Va = V_{BE1} + V_p \tag{4}$$

The equation (3) is combined with the equation (4) to obtain follows:

$$Ia = (Vcc - V_{BE1} - V_p)/R_M \tag{5}$$

Since the torque of the DC motor 10 depends upon Ia, the torque is set to a desired value by adjusting $V_p$ or the variable resistor 33. Further, when the power supply voltage Vcc is increased or decreased, $V_p$ is synchronously increased or decreased in response thereto. Therefore, the torque change against the variation of the power supply voltage can be limited.

Figure 4:
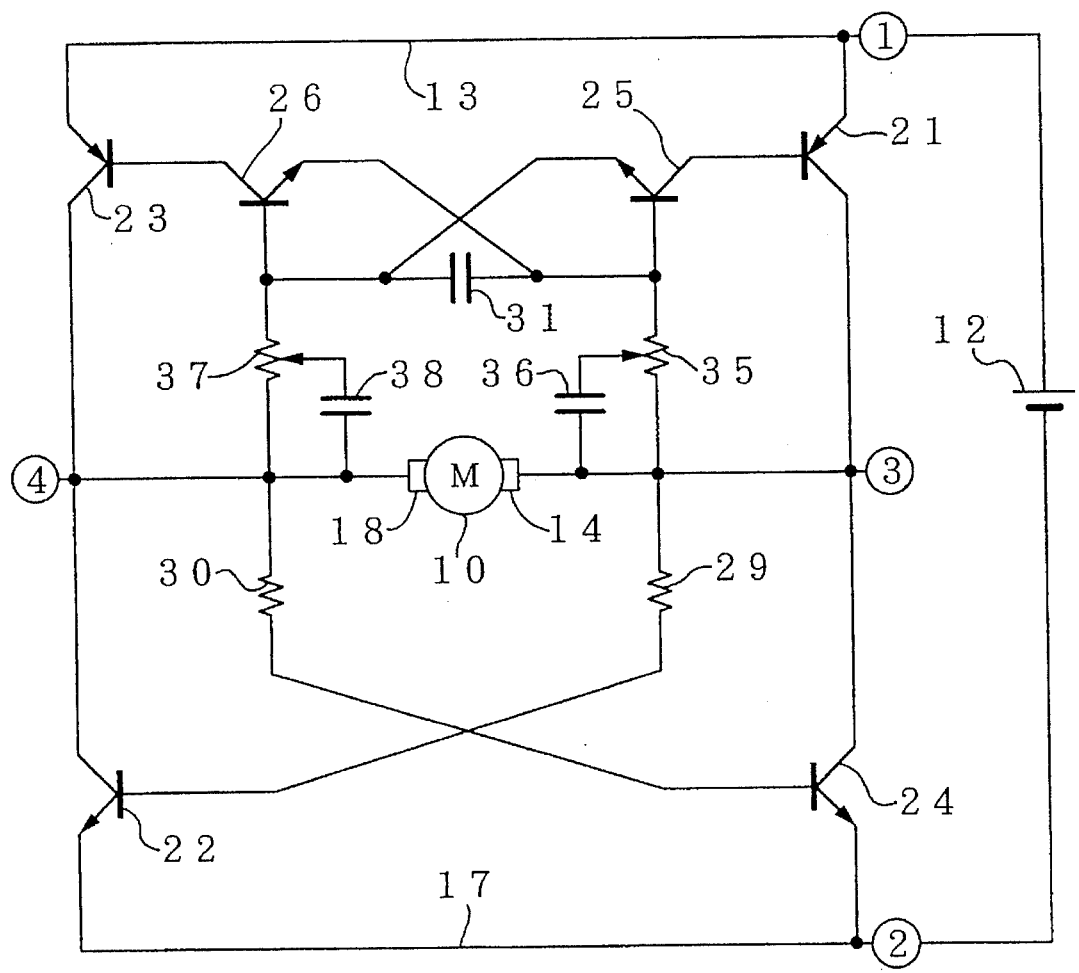
FIG. 4 is a schematic diagram of a control circuit of a DC motor showing a second embodiment of the invention.

Referring now to FIG. 4, a second embodiment of a DC motor control circuit according to the present invention is shown. This control circuit is identical to those of FIG. 2 except that resistors 27 and 28 are substituted with same resistance variable resistors 35 and 37, respectively, and each of capacitors 36 and 38 is connected between one end and a movable terminal or tap of variable resistors 35 and 37, respectively.

Values of the capacitors 36 and 38 are predetermined so that the torque upon applying an external force is decreased when the movable terminal is moved to the junction between base and emitter sides of the detection transistors 25 and 26, and increased when the movable terminal is moved to the output terminal sides. As described the above, the torque of the DC motor 10 is controlled by using a phenomena that the torque is proportional to the amplitudes of positive and negative pulses generated during the rotation. Therefore, variable resistors 35 and 37 and capacitors 36 and 38 constitute individual two high-pass filters each with an adjustable cutoff frequency for high order harmonic components of the pulses.

Figure 6A:
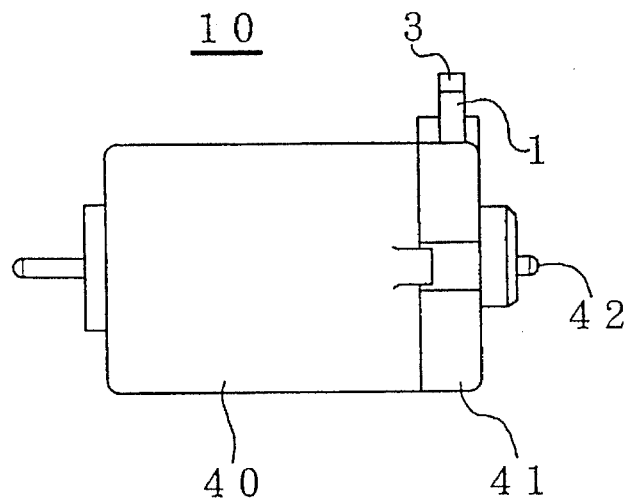
FIGS. 6a and 6b are a schematic diagram of another DC motor according to the invention in which the control circuit of FIG. 3 is installed.
Figure 6B:
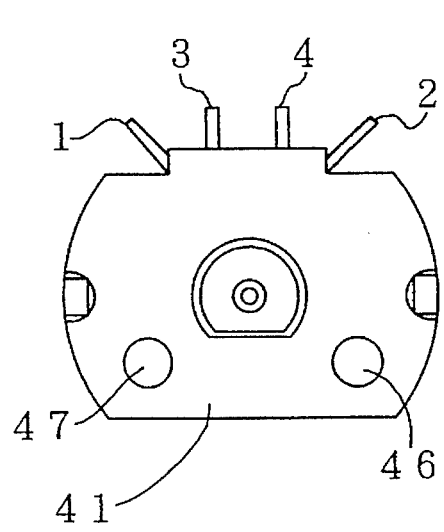
Figure 8:
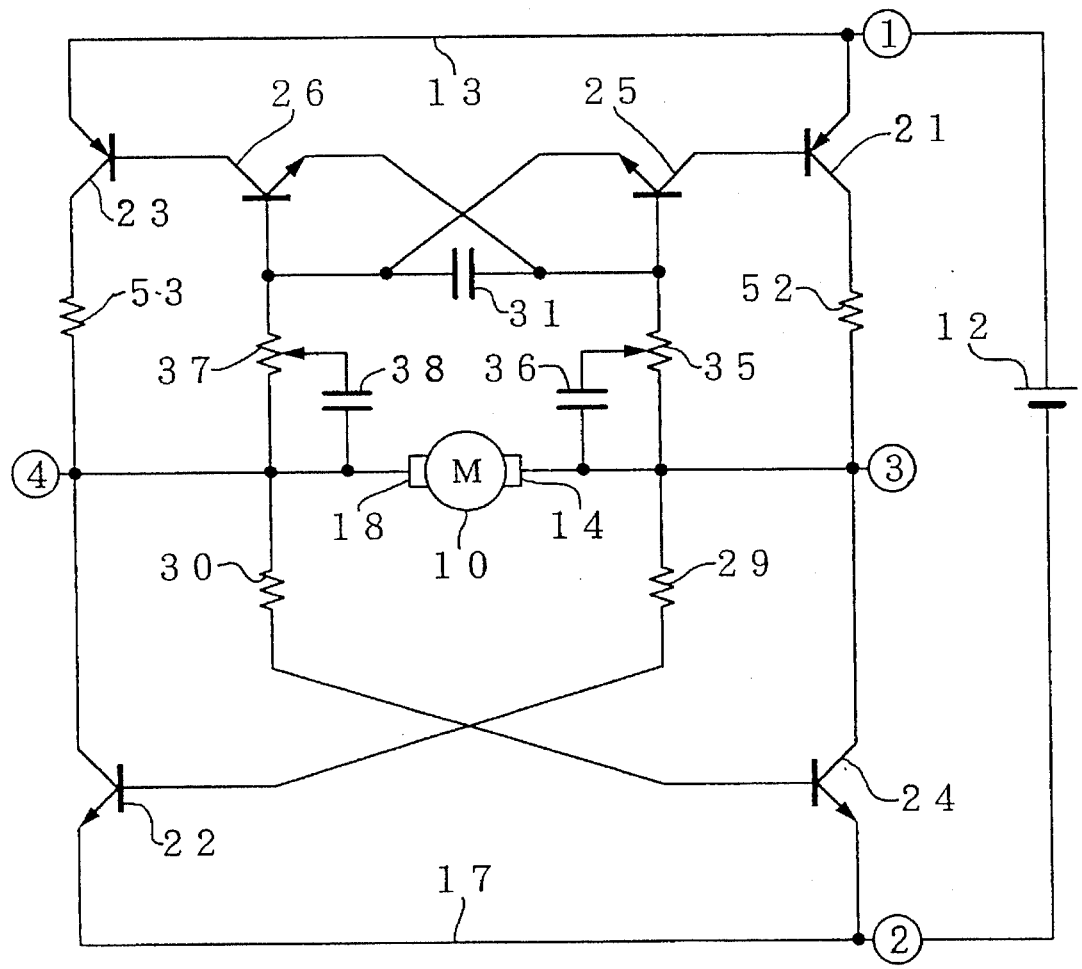
FIG. 8 is a schematic diagram of a control circuit of a DC motor showing a third embodiment of the invention similar to that of FIG. 4.

Similarly, this DC motor control circuit is also another monolithic or hybrid integrated circuit provided or integrated on silicon substrate or alumina ceramics, and installed or mounted on inner side or bracket 41 of a micro-motor or three-phase brush DC motor 10 as shown in FIGS. 6a and 6b. The power supply terminals and output terminals (circled 1 to 4, respectively) as shown in FIGS. 4 and 8 are identical to the power supply terminals 1 and 2 and output terminals 3 and 4 each provided on the insulated bracket 41 of the DC motor 10 as shown in FIG. 6. An external DC power supply 12 is connected between the power supply terminals 1 and 2.

The control circuit is active when the external force causes an output axis 42 of the DC motor 10 to normal or reverse rotate, and becomes the rest condition upon restraining the rotating output axis 42. For example, when an external force causes the DC motor 10 to normal rotate, the collector-emitter of the normal detection transistor 25 is turned on by a selfish induced voltage.

First, the normal current supplied from the positive power supply terminal 1 to the negative power supply terminal 2 is passing through the base of the normal drive transistor 21, the collector to emitter of the normal detection transistor 25, the variable resistor 37 and collector of the normal drive slave transistor 22. Next, the normal drive transistors 21 and 22 are subsequently turned on through the collector of the normal derive transistor 21, the resistor 29 and the base of the normal drive slave transistor 22. Finally, the current is supplied from brushes 14 to 18 of the DC motor 10 to normal rotate the output axis 42 of the DC motor 10, and then, the DC motor continues the rotation even if the external force is removed.

In this manner, normal drive transistors 21 and 22 have a master slave relation. Reverse drive transistors 23 and 24 have a master slave relation as well. Since serial connected two drive transistors 21 and 24 or 23 and 22 are not turned on simultaneously in triggering the DC motor, a long life control circuit is provided.

The operation of the control circuit as shown in FIG. 4 is also identical to those of FIG. 3. Upon the normal rotation, the normal torque is adjusted by the variable resistor 37 and the capacitor 38. In this case, since the base current of the transistor 25 passing through the variable resistor 35 is reduced to, for example, 0.01 times the emitter current thereof depending upon its current amplitude, the torque adjustment by the variable resistor 35 and the capacitor 36 is negligible. On the other hand, upon reverse rotation, the reverse torque is also adjusted by the variable resistor 35 and the capacitor 36. In this case, since the base current of the transistor 26 passing through the variable resistor 37 is reduced to, for example, 0.01 times the emitter current thereof depending upon its current amplitude, the torque adjustment by the variable resistor 37 and the capacitor 38 is also negligible.

It is important that the DC motor 10 and its control circuit constitute integral fashion, because the resistance $R_M$ of the rotor coils of the DC motor is dispersed and the same circuit constant is not applied to several capacities of the DC motors. Accordingly, the control circuit is installed in the housing of the DC motor with matched circuit constants to characteristics or ratings of the DC motor.

FIGS. 5a and 5b and FIGS. 6a, 6b show configurations of first and second embodiments of DC motors each including a suitable control circuit according to the present invention, respectively, (a) denoting its front view and (b) side view. In these drawings, a stator (not shown) is provided inside a metal case or housing 40 of the DC motor 10. A plastic bracket 41 covers the opening of the metal case 10. Therefore, the output axis 42 fixed to rotor coils (not shown) is rotatably supported by the metal case 40 and the bracket 41.

Disposed on the upper side of the bracket 41 are power supply terminals 1 and 2, and further output terminals 3 and 4 each soldered through cables on corresponding pad of the printed circuit board of the control circuit mounted in the inner recess of the bracket 41. Provided on the lower portion of the bracket 41 are holes 45, 46 and 47 through which extensions, for example nobs or plus or minus recess for adjustable rods, for the movable terminals of the variable resistor 33, 35 and 37 are projected or accessible. Therefore, normal and reverse variable resistors 35 and 37 can be individually adjusted.

The control circuit constants are determined so that the drive transistor according to the present invention has a predetermined or 70 ohms ON resistance. Then, for example, a 51 ohms collector resistor 51 may be connected between the collector of the drive transistor 11 and the output terminal (circled 3) as shown in FIG. 7, as well as, for example, 51 ohms collector resistors 52 and 53 may be connected between the respective collector of the drive transistors 21 and 22, and the respective output terminals (circled 3 and 4) as shown in FIG. 8.

As described the above, the DC motor control circuit according to the present invention can adjust its restraint torque, predetermine the circuit constants matched with the ratings of the DC motor and be installed within the DC motor. Therefore, there are many advantages among which the DC motor with a selfish control circuit is simplified with higher reliability and lower cost than the discrete assembled DC motor and control circuit.

The foregoing disclosure and description of the invention are illustrative and explanatory thereof, and various changes in the size, shape, materials, components, circuit elements, wiring connections and contacts, as well as in the details of the illustrated circuitry and construction may be made without departing form the spirit of the invention.

What is claim is:

1. A control circuit for a DC motor comprising:

a detection transistor coupled to a DC motor being turned on when a DC component of an induced voltage generated during the rotation of the DC motor is applied to said detection transistor and being instantly turned off by pulse components of the induced voltage;

a drive transistor coupled to said detection transistor for receiving an output current from said detection transistor as a control current for supplying a drive current to said DC motor when said detection transistor is turned on;

a variable resistor having a movable terminal coupled to said detection transistor being a load resistor for said detection transistor and acting as negative feedback for its control input; and a capacitor connected between one end of said variable resistor and said movable terminal of said variable resistor to reduce the nominal resistance of said variable resistor.

2. A control circuit for a DC motor having first and second brushes comprising:

a first drive transistor having an emitter, base and collector with its collector connected to said first brush of said DC motor;

a first detection transistor having an emitter, base and collector with its collector connected to said base of said first drive transistor and its base connected to said first brush;

a first variable resistor having a movable terminal and first and second ends, said first end connected between the emitter of said first detection transistor and said second end connected to said second brush of said DC motor; and a first capacitor connected between said second brush and said movable terminal of said variable resistor to reduce the nominal resistance of said variable resistor.

3. A DC motor in which the control circuit of claim 1 or 2, is installed therein, and comprises a housing having two power supply terminals for feeding the power energy thereto, and an output terminal directly connected to the first brush.

4. The control circuit of claim 2, further comprising:

a second detection transistor and a second drive transistor each having a base, emitter and collector;

a second variable resistor connected between said second detection transistor and said first brush, and a first slave drive transistor having its collector connected to said second brush and its base connected to said first brush through a first resistor to provide a normal rotation drive circuit;

said second drive transistor having its collector connected to said second brush;

said second detection transistor having its collector connected to the base of said second drive transistor, its base connected to said first variable resistor and its emitter connected to said second variable resistor;

a second capacitor connected between said second brush and said movable terminal of said second variable resistor to reduce the nominal resistance of said variable resistor; and a second slave drive transistor having its collector connected to said first brush and its base connected to said second brush through a second resistor to provide a reverse rotation drive circuit.

5. A DC motor control circuit of claim 4, said first and second drive transistors are emitter coupled to a first power supply line and said first and second slave drive transistors are emitter coupled to a second power supply line.

6. A DC motor in which the control circuit of claim 5 is installed therein, and in which first and second drive transistors and said first and second slave transistors are bridge connected to each other, and comprises a housing having two power supply terminals for feeding the power energy thereto, and two output terminals directly connected to the first and second brushes, respectively.

* * * * *